Nov. 5, 1968 C. LAUXEN ETAL 3,409,795
CONTINUOUS BURNING HIGH-INTENSITY ARC LAMP
Filed Dec. 27, 1966 2 Sheets-Sheet 1
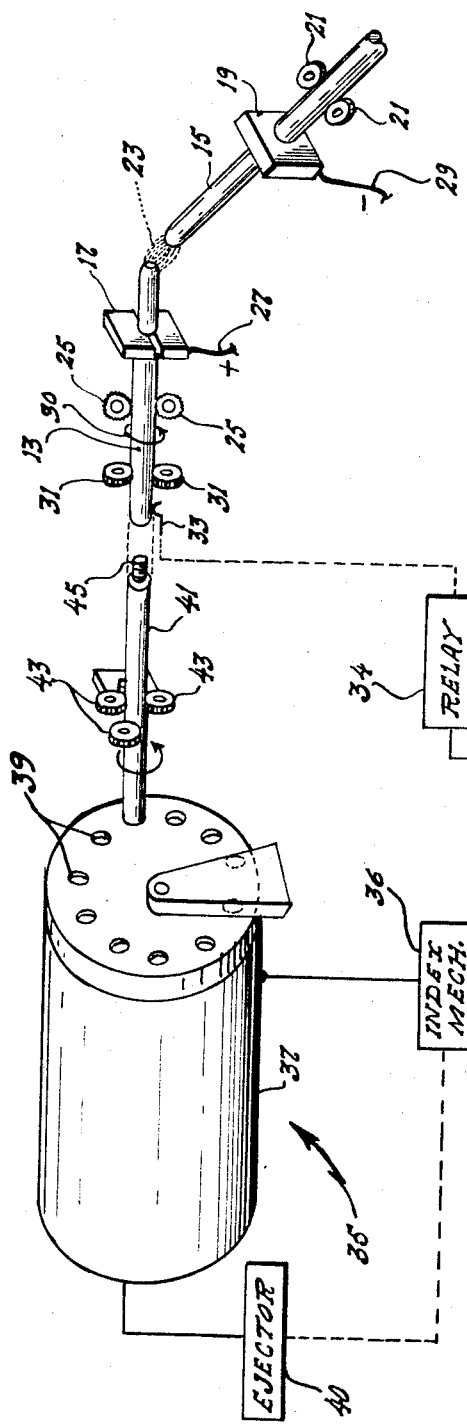
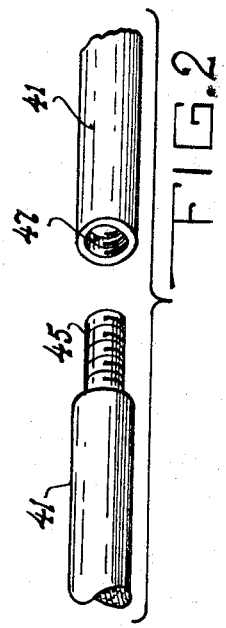
INVENTORS.
CARL LAUXEN and
JOHN B. LONG Jr.
BY Harry A. Herbert Jr.
Arsen Tashjian and
ATTORNEYS United States Patent Office 3,409,795
Patented Nov. 5, 1968

3,409,795
CONTINUOUS BURNING HIGH-INTENSITY
ARC LAMP
Carl Lauxen, Haddonfield, and John B. Long, Jr., Medford, N.J., assignors, by mesne assignments, to the United States of America
Continuation-in-part of application Ser. No. 324,899, Nov. 19, 1963. This application Dec. 27, 1966, Ser. No. 605,109
4 Claims. (Cl. 314—1)

This is a continuation-in-part of application Ser. No. 324,899, filed Nov. 19, 1963, now abandoned.

This invention relates to a continuous burning high-intensity arc lamp and more particularly to a method and means for providing substantially uninterrupted operation of a carbon arc lamp by the utilization of a mechanized replaceable magazine and the implementation of automatic electrode joining.

The expression "continuous burning" as applied to a carbon arc lamp has come to mean that the lamp is designed to operate virtually unattended for extended periods of time. Ordinarily, the cycle of operation of a carbon arc lamp is limited to a relatively short time because of rapid consumption of the positive electrode during normal operation due to the fact that the positive carbon is provided with special core of soft earths in order to obtain a close approximation of the solar spectrum. Under certain conditions, such as in motion picture projection, this creates no great problem because two lamps are utilized allowing one of the lamps to be shut down while the reel of film is being changed and the consumed carbon-electrode can be replaced by an unused one at the same time. During this operation, the other projector is showing the next reel. However, when it is necessary to produce high-intensity light for substantially continuous and uninterrupted periods of time, the presently known carbon arc lamps used in search lights and for motion picture projections would not meet the requirements or produce the necessary results.

Accordingly, it is an object of the present invention to provide an arc lamp with substantially continuous positive electrode burning through the use of a magazine containing sufficient electrodes for extended periods of time.

Another object of the present invention is to provide a magazine for use with a long slow burning negative electrode capable of burning for extended periods of time.

Still another object of the invention is to provide an arc lamp capable of substantially continuous operation wherein the forward end of each positive electrode is provided with a male thread for engagement with the rearward end of the next preceding positive electrode which is provided with a mating female thread.

A further object of the present invention is to provide an end detector for automatically signalling the time when the end of the burning positive electrode is near so that the next electrode can be ejected from the magazine and joined thereto.

A still further object of the invention is to provide rotating means for turning the burning positive electrode while being fed forward in order to maintain a smooth crater edge.

Another still further object of the invention is to provide means for urging the male threaded end of the next following positive electrode into contact with the female threaded end of the burning electrode and rotating until the two electrodes are joined in threaded engagement to one another.

Still another object of the invention is to provide a high current low friction electrode clamp for supporting and guiding the negative electrode toward the arc flame while simultaneously supplying the electrode with the required current. This is accomplished without the use of rigid or spring loaded clamping of the electrical conductor to the negative electrode.

These and other objects, features and advantages of the invention will become more apparent from the following description taken in connection with the accompanying drawings, wherein:

FIGURE 1 is a view schematically showing an embodiment of the present invention in perspective representation;

FIGURE 2 is a view in perspective of the details of the threaded ends of the electrodes;

Figure 3:
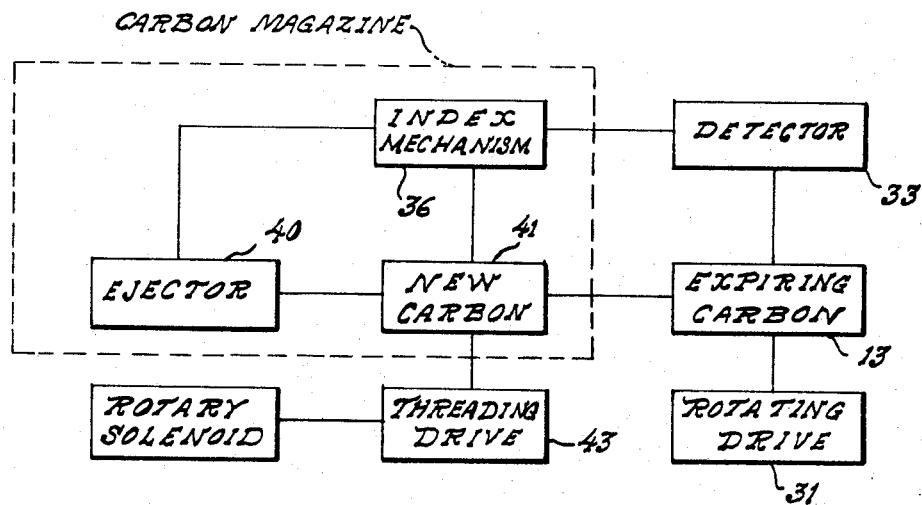
FIGURE 3 is a block diagram indicating the relationship and interaction between the various elements of the invention.

Referring now to FIGURE 1, there is shown a continuous burning high-intensity arc lamp according to the invention comprising a positive electrode 13 and a negative electrode 15. The positive electrode 13 is provided with a hollow metal jaw 17 for guiding and conducting high D.C. arc current to the electrode from a positive power source. The jaw 17 is composed of two halves, spring-loaded to assure adequate contact to the electrode 13 and water is circulated through the hollow sections of the jaw to counter the high arc heat.

The negative electrode 15 is provided with a water cooled jaw 19 having a clearance hole through which the negative electrode passes while being driven by a pair of driving rollers 21, thereby advancing it toward the point of arc 23. This non clamping jaw 19 is rigidly mounted to support and guide the electrode 15 toward the arc flame. Although a clearance exists between the negative electrode 15 and the bored opening in guide jaw 19, a satisfactory current flow is established by taking advantage of the unusual phenomenon in high current devices which provides for substantially uninterrupted current flow through an apparently poor electrical connection where the more positive element is of carbon while the more negative portion may be of metal. In the present invention, a current of 160 amperes flows continuously between the unplated negative carbon 15 and the guide 19 which may be fitted with a silver liner for more efficient operation.

The positive electrode 13 is likewise provided with a pair of driving rollers 25 for advancing the electrode 13 toward the same arc point 23. The spring loaded guide jaw 17 is provided with a lead wire 27 which serves to carry the positive current to the electrode 13 through the jaw while the lead wire 29 serves to carry the negative current to the negative electrode 15. To assure uniform burning and to maintain an evenly consumed crater edge, the burning high-intensity positive carbon is caused to rotate slowly in a counter clockwise direction as indicated by the arrow 30 using the positive carbon rotation rollers 31 while the burning electrode is being fed forward by the driving rollers 25. The carbon rotation and advance mechanism is located in a low temperature area and a plurality of toothed driving wheels are utilized for rotating the carbon and advancing it at the proper burning rate.

Detecting means 33 are provided for signalling the approach of the end of the advancing positive electrode 13. The detecting means 33 may be simply a spring leaf which contacts the side of the active electrode 13. Being active the electrode is hot electrically and the contact detects a D.C. voltage energizing a relay 34. When the electrode 13 has been advanced sufficiently forward to pass beyond contact, the relay serves to initiate the activation of a series of solenoid operations which serve to join another electrode automatically to the expiring carbon.

Figure 4:
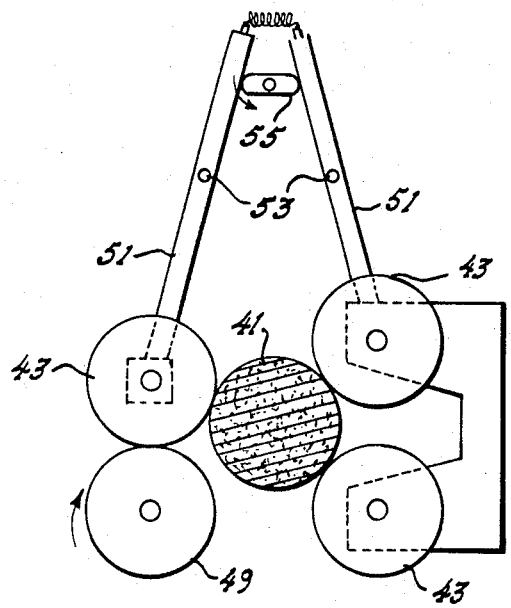
FIGURE 4 is a general schematic view of the electrode threading arrangement for attaching the new electrode to the expiring one.

Since the present invention is concerned with a so-called continuous burning arc lamp, means are provided for automatically replacing the burned positive electrode without interrupting the operation of the lamp. A rotating magazine generally designated by the reference numeral 35 is caused to rotate by the index mechanism 36 and includes a rotating cylinder member 37 in which a plurality of unused positive electrodes are stored. The forward end of the cylinder 37 is provided with a corresponding plurality of openings 39 dimensioned to allow clear passage of unused positive electrodes therethrough upon the urging of the ejector 40. As shown in FIGURE 1, an unused positive electrode 41 protrudes through one of the openings 39. Rotation rollers 43 are provided for rotating the unused electrode 41 counter clockwise at a more rapid rate than the electrode 13 so that when the forward outside threaded end 45 of the electrode 41 engages the correspondingly inside threaded rearward end 47 (shown in FIGURE 2) of electrode 13, the two positive electrodes are threaded together and become integral one with the other. In FIGURE 4, there is shown a set of rotation rollers 43 which include friction drive wheels provided with neoprene tires. One of these wheels is driven by the drive wheel 49 while two others are supporting idlers. The driven wheel and the pair of idlers are mounted on opposing movable arms 51 which individually pivot around the points 53. A cam 55 driven by a rotary solenoid forces the arms 51 toward each other upon an electrical command after the electrode 41 to be rotated has been inserted therebetween.

In operation, the continuous burning arc lamp is first activated by striking an arc between the positive electrode 13 and the negative electrode 15. The driving rollers 21 feed the negative electrode 15 forward toward the arc point through the water cooled guide jaw 19 which serves to apply a negative potential to the electrode 15. An unusual feature of the guide jaw 19 is the provision of a central clearance hole through which the electrode passes and, even though the electrical connection between the jaw 19 and the negative electrode 15 is not tight or rigid, the current flows continuously to the electrode and a highly satisfactory and substantially friction-free electrical connection is thereby formed.

The positive electrode 13 is fed forward by the driving rollers 25 and is guided by the spring-loaded guided jaw 17 which also serves to feed the positive current to the electrode 13. Since the positive electrode 13 must be manufactured to include a soft central core, it burns at a rate many times faster than the negative electrode. In a carbon arc lamp according to the present invention, the positive electrode burns at the rate of 16 to 18 inches per hour while the negative electrode is consumed at the rate of 1.1 inches per hour. Thus, it can be seen that it is necessary to periodically replace the positive electrode in order to keep the lamp operating.

In the present invention, this is accomplished by using a rotating magazine 35 having a storage cylinder 37 provided with a series of openings 39 in the forward end. As the positive electrode 13 is consumed, it moves forward toward the arc and is slowly rotated by the rotation rollers 31. When the rearward end of the electrode reaches the detecting means 33, a signal is sent through the relay 34 to an indexing mechanism 36 in communication with the magazine 35 which causes the cylinder 37 to rotate clockwise one position. An ejector solenoid 40 then ejects the electrode 41 from the magazine and urges it toward the rearward end of electrode 13. The ejector 40 is a modified A.C. solenoid having its armature attached through a spring to a plunger which pushes the end of the electrode 41 forward to protrude through an opening 39 in the magazine 37. The armature is rapidly retracted into the solenoid of the ejector 40 storing energy in a spring. Force is applied by the stressed spring to a plunger arm whose motion is restrained by an air dashpot. The resulting force applied to the electrode 41 is smooth and gentle. The electrode 41 is pushed forward through the open pulleys 43 of the threading device until the threaded male end 45 of the electrode 41 comes into contact with the threaded female end 47 of the expiring electrode 13.

The threading device shown in FIGURE 4 includes a set of friction rollers 43 which rotate the new electrode 41 while the ejector 40 applies its continuous but compliant force to the free end thereof. For better surface contact each of the wheels 43 may be provided with neoprene tires. The driven wheel and the pair of idlers are mounted on opposing movable arms 51. A cam 55 driven by a rotary solenoid forces the arms 51 toward each other in response to an electrical command which occurs at the time the two electrodes contact each other. The new electrode 41 which has been inserted between the rollers 43 on the arms 51 is caused to rotate when the solenoid is energized and the drive roller 49 rotates the driven wheel 43. This rotation together with the continuous thrust of the injection plunger result in the joining of the fresh electrode 41 with the expiring carbon 13. The threading rotation is 14 r.p.m., slightly faster than the normal 4 r.p.m. rotation of the forward carbon 13 and in the same direction. This results in a relative threading rate of 10 r.p.m.

The joined electrodes then move forward toward the arc point 23. No noticeable change in the plasma ball characteristics can be observed as the threaded joint is consumed by the arc. Upon the detection of the rearward end of the electrode by the detecting means 33, the complete cycle is repeated until all of the stored positive elements are consumed. In FIGURE 3, the sequence of operations which automatically join the electrodes are indicated. As shown, the detector 33 initiates the cycle which energizes the index mechanism 36 to turn the magazine 37 one position. The ejector 40 then forces the electrode 41 through the open threading device and into contact with the expiring electrode 13. The rotary solenoid then closes the threading device which is driven by the drive wheel 49 causing the two electrodes to be joined to provide continuous operation of the arc lamp.

A carbon arc lamp which employs the principle of the present invention may be designed to operate continuously for a period of 24 hours. In a high-intensity lamp operating at 77 volts and 160 amperes, a negative electrode ⅝ inches in diameter and 33 inches long would be consumed at the rate of 1.1 inches per hour. The corresponding positive electrode would be 13.6 mm. in diameter and would require at least 432 inches of length in a 24 hour period. The magazine type supply herein disclosed allows the positive electrode to be separated into short lengths and fed into the lamp as required without interrupting the output of light energy therefrom.

It will be understood by those skilled in the art that the invention has been described with reference to a particular embodiment and that various changes and modifications may be made in the device without departing from the true spirit and scope of the invention.

Having thus described our invention, what we claim as new and desire to secure by Letters Patent in the United States is:

1. In a continuous burning high-intensity arc lamp including a pair of arcing electrodes, a plurality of drive rollers for feeding said electrodes toward a common arc point, guide and jaw means for applying potentials of opposite polarity to each of said arcing electrodes, a first pair of rotation rollers for slowly rotating the arcing electrode of positive polarity in a clockwise direction, said positive electrode having an inside threaded rearward end, means for providing a continuous supply of electrodes to said lamp comprising, detecting means for signalling the approach of the rearward end of said positive electrode, a rotating magazine for storing and urging unused electrodes forward into contact with the rearward end of said positive electrode in response to the signal from said detecting means, a second pair of rotation rollers pivotally mounted for rotating the unused electrode from said magazine clockwise at a faster rate than the slowly rotating positive electrode, said unused electrode having an outside threaded forward end arranged to engage the threads in the rearward end of said positive electrode, the relative difference in rotation causing said unused electrode to be threaded into said positive electrode and becoming an integral part thereof.

2. The continuous burning arc lamp defined in claim 1 wherein the guide and jaw means for applying the potential to the negative electrode comprises a block of conducting material having a clearance hole through which said electrode passes, said clamp means being capable of conducting high current to said negative electrode without the application of frictional force thereto.

3. In combination, an arc lamp having positive and negative electrodes, and means for providing a continuous supply of positive electrodes to said lamp comprising, a rotatable cylindrical magazine for storing a plurality of unused positive electrodes therein, said magazines having openings in the forward end thereof for positioning in alignment with the axis of said positive electrode, means for ejecting an unused electrode from said magazine through the aligned opening into contact with the positive electrode, and means for attaching the forward end of the ejected electrode to the rearward end of the positive electrode thereby providing a continuous supply of electrodes to said arc lamp.

4. The combination defined in claim 3 wherein the means for attaching the unused electrode to the positive electrode includes a first pair of rotation rollers in contact with the positive electrode for slowly rotating said positive electrode in a clockwise direction, a second pair of rotation rollers pivotally mounted in contact with the ejected unused roller for rotating said unused electrode at a relatively faster rate in a clockwise direction, and correspondingly threaded portions on said unused electrode and said positive electrode for threaded attachment to each other.

References Cited
UNITED STATES PATENTS

| | | | |
|---|---|---|---|
| 469,093 | 2/1892 | Sawyer | 314—6 |
| 1,062,907 | 5/1913 | Guay | 314—5 |
| 1,959,180 | 5/1934 | Stephens | 219—136 |
| 2,216,352 | 10/1940 | Mole et al. | 314—45 X |
| 2,428,849 | 10/1947 | Kratz et al. | 219—136 |
| 2,453,175 | 11/1948 | Youngson et al. | 314—40 |
| 2,786,958 | 3/1957 | Frey | 314—5 X |
| 2,903,494 | 9/1959 | Meffert | 13—14 |

BERNARD A. GILHEANY, *Primary Examiner.*

R. N. ENVALL, *Assistant Examiner.*